US012647413B2

(12) United States Patent
Park et al.

(10) Patent No.: US 12,647,413 B2
(45) Date of Patent: Jun. 2, 2026

(54) ELECTRONIC DEVICE FOR PERFORMING DIFFERENT LOGIN PROCESS ACCORDING TO AUTHENTICATION TYPE AND CONTROL METHOD THEREOF

(71) Applicant: SAMSUNG ELECTRONICS CO., LTD., Suwon-si (KR)

(72) Inventors: Sanghyun Park, Suwon-si (KR); Heangsu Kim, Suwon-si (KR); Myungkeun Oh, Suwon-si (KR); Jieun Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 321 days.

(21) Appl. No.: 17/884,000

(22) Filed: Aug. 9, 2022

(65) Prior Publication Data

US 2023/0042496 A1     Feb. 9, 2023

Related U.S. Application Data

(63) Continuation of application No. PCT/KR2022/011790, filed on Aug. 8, 2022.

(30) Foreign Application Priority Data

Aug. 9, 2021    (KR) ........................ 10-2021-0104850

(51) Int. Cl.
*H04L 9/40* (2022.01)
*H04W 12/30* (2021.01)

(52) U.S. Cl.
CPC ........ *H04L 63/0853* (2013.01); *H04L 63/083* (2013.01); *H04L 63/0861* (2013.01); *H04W 12/30* (2021.01); *H04L 2463/082* (2013.01)

(58) Field of Classification Search
CPC ... H04L 63/0853; H04L 63/083; H04L 63/08; H04L 63/0861; H04L 2463/082;
(Continued)

(56) References Cited

U.S. PATENT DOCUMENTS 8,595,810 B1 * 11/2013 Ben Ayed ........... H04L 63/0815
713/168
9,113,320 B2 8/2015 Litvin et al.
(Continued)

FOREIGN PATENT DOCUMENTS

AU 2016203264 A1 * 6/2016 ........... G06F 21/105
CN 102571336 A 7/2012
(Continued)

OTHER PUBLICATIONS

Choi, J., Cho, H., Yi, J. H. "Personal Information Leaks with Automatic Login in Mobile Social Network Services". Entropy 2015, vol. 17, Issue 6, pp. 3947-3962. Jun. 10, 2015. (Year: 2015).*
(Continued)

*Primary Examiner* — William S Powers
(74) *Attorney, Agent, or Firm* — CANTOR COLBURN LLP

(57) ABSTRACT

Electronic devices perform a login process differently depending on a type of authentication, and control methods are described. Electronic devices may include a communication module and at least one processor. The at least one processor is configured to receive a signal for requesting transmission of user information stored in the electronic device via the communication module from an external electronic device operatively connected to the electronic device. Based on the reception of the signal, first type authentication or second type authentication different from the first type authentication is performed. Information associated with whether the first type authentication is performed (Continued)

or the second type authentication is performed, together with the user information, is transmitted to the external electronic device so that a login process different depending on the first type authentication or the second type authentication is performed in the external electronic device.

14 Claims, 11 Drawing Sheets

(58) Field of Classification Search
CPC .......... G06F 21/30; G06F 21/31; G06F 21/32; H04W 12/30
See application file for complete search history.

(56) References Cited

U.S. PATENT DOCUMENTS

| | | | | |
|---|---|---|---|---|
| 9,311,032 | B2 | 4/2016 | Lee et al. | |
| 9,426,182 | B1* | 8/2016 | Zeljko | H04L 63/08 |
| 10,200,359 | B1* | 2/2019 | Sokolov | H04L 63/0853 |
| 10,951,606 | B1* | 3/2021 | Shahidzadeh | H04L 63/107 |
| 2008/0115208 | A1* | 5/2008 | Lee | G06F 21/31 |
| | | | | 726/19 |
| 2009/0144810 | A1* | 6/2009 | Gilboy | G06F 16/951 |
| | | | | 726/5 |
| 2010/0199336 | A1* | 8/2010 | Tan | H04L 9/3228 |
| | | | | 726/6 |
| 2013/0104219 | A1* | 4/2013 | Kumar | H04L 63/0815 |
| | | | | 726/5 |
| 2013/0333003 | A1* | 12/2013 | Roy | G06F 21/40 |
| | | | | 726/5 |
| 2013/0340044 | A1 | 12/2013 | Litvin et al. | |
| 2014/0189808 | A1* | 7/2014 | Mahaffey | G06F 21/6245 |
| | | | | 726/4 |
| 2014/0337956 | A1* | 11/2014 | Korgaonkar | H04L 63/0853 |
| | | | | 726/9 |
| 2015/0029532 | A1 | 1/2015 | Lee et al. | |
| 2015/0288681 | A1* | 10/2015 | Park | H04W 12/06 |
| | | | | 726/6 |
| 2017/0149774 | A1* | 5/2017 | Blinn | H04L 63/083 |
| 2017/0244703 | A1 | 8/2017 | Lee et al. | |
| 2018/0034799 | A1* | 2/2018 | Zhang | G06F 21/32 |
| 2018/0357403 | A1 | 12/2018 | Shnurenko et al. | |
| 2019/0026446 | A1* | 1/2019 | Hallenborg | H04L 63/0838 |
| 2019/0273607 | A1* | 9/2019 | Van Der Velden | H04L 9/088 |
| 2020/0244626 | A1 | 7/2020 | Kwon et al. | |
| 2020/0301720 | A1 | 9/2020 | Choi | |
| 2020/0358760 | A1 | 11/2020 | Krishan | |
| 2020/0412703 | A1* | 12/2020 | Kohli | G06F 21/6245 |
| 2021/0136056 | A1 | 5/2021 | Lee et al. | |
| 2021/0209217 | A1* | 7/2021 | Subramanian | G06F 21/40 |

FOREIGN PATENT DOCUMENTS

| | | | |
|---|---|---|---|
| CN | 103533392 | A | 1/2014 |
| CN | 107426139 | A | 12/2017 |
| KR | 20100110955 | A | 10/2010 |
| KR | 1020130093838 | A | 8/2013 |
| KR | 20150014316 | A | 2/2015 |
| KR | 20150023230 | A | 3/2015 |
| KR | 20200092101 | A | 8/2020 |
| KR | 102162763 | B1 | 10/2020 |

OTHER PUBLICATIONS

Omar Zeyad Akjf, "Secure authentication procedures based on timed passwords, honeypots, honeywords,and multi-factor techniques", Dec. 2017, "Brunel University London", "Thesis,", 85-97. (Year: 2017).*

International Search Report and Written Opinion for International Application No. PCT/KR2022/011790; Date of Search: Nov. 11, 2022; with English Translation of Search; 8 pages.

Extended European Search Report corresponding to Application No. 22856149.4-1218; Dated Sep. 17, 2024.

* cited by examiner

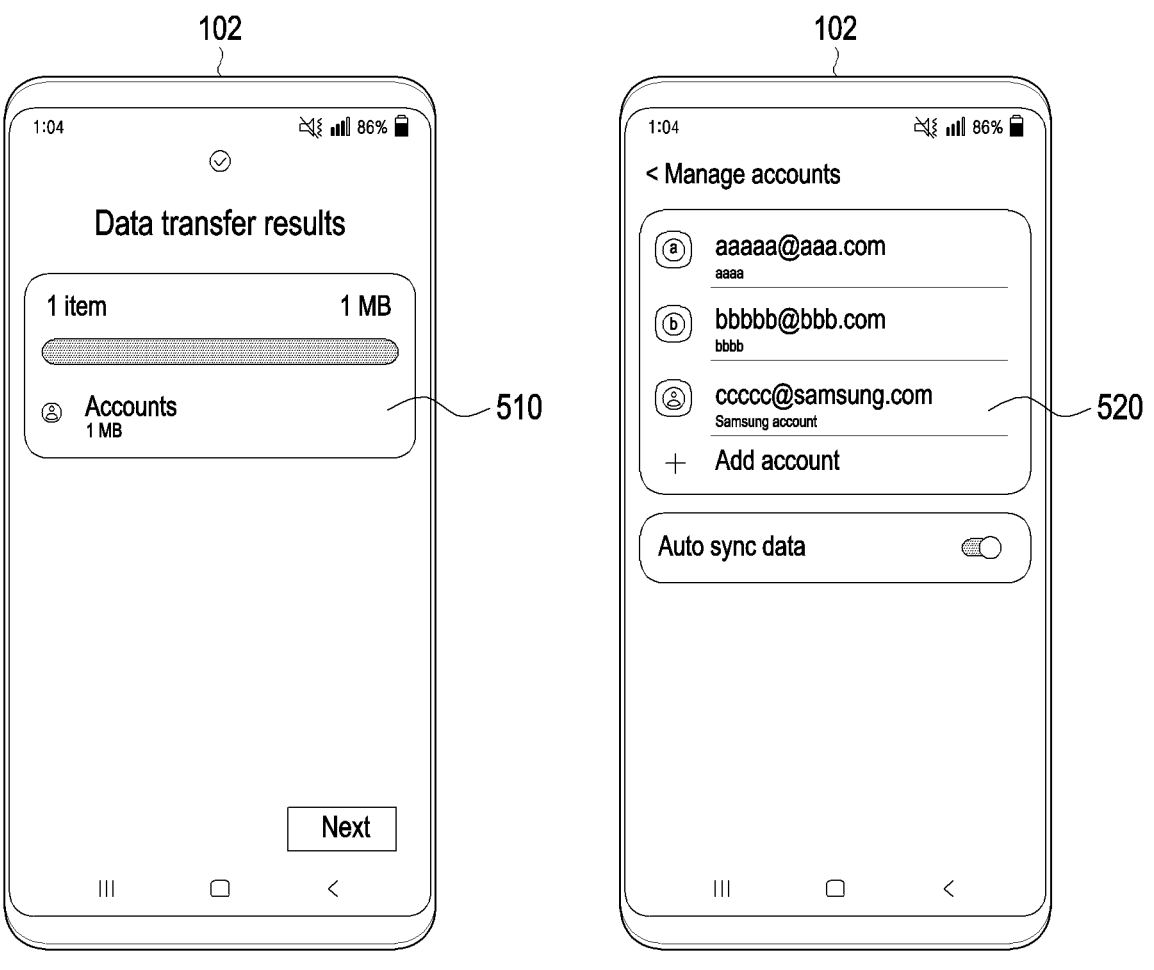
FIG. 5A                    FIG. 5B

ELECTRONIC DEVICE FOR PERFORMING DIFFERENT LOGIN PROCESS ACCORDING TO AUTHENTICATION TYPE AND CONTROL METHOD THEREOF

CROSS REFERENCE TO RELATED APPLICATIONS

This application is a PCT-Bypass Continuation of International Patent Application No. PCT/KR2022/011790, filed on Aug. 8, 2022, which claims priority to Korean Patent Application No. 10-2021-0104850, filed on Aug. 9, 2021, and all the benefits accruing therefore under 35 U.S.C. § 119, the contents of which are hereby incorporated by reference for all purposes as if fully set forth herein.

TECHNICAL FIELD

The disclosure relates to an electronic device for performing a login process differently depending on the type of authentication and a control method thereof.

BACKGROUND ART

Various services and additional functions provided via an electronic device, for example, a portable electronic device such as a smartphone, have been gradually increased. To increase the effective value of such electronic device, and to satisfy various desires of users, communication service providers or electronic device manufacturers have provided various functions, and have competitively developed an electronic device distinguished from other companies. Accordingly, various functions provided via an electronic device have been gradually advanced.

DISCLOSURE

Technical Problem

In the case in which a user of an electronic device (e.g., a smartphone) replaces the electronic device with a new electronic device, sometimes the user transfers data which has been stored in the existing electronic device to the new electronic device via wired communication or wireless communication (e.g., Samsung® Smart Switch™).

In this instance, normal data such as images, contact information, text messages transmitted or received via a partner may be transferred from the existing electronic device to the new electronic device without any restriction. However, in association with user information (e.g., Samsung® account, in other words, a user ID), particularly, user information that requires two-factor authentication (2FA) in order to log in, a complex process may be needed for security and/or data transferring, and thus it is not allowed to transfer the user information from the existing electronic device to the new electronic device.

Technical Solution

According to an embodiment of the disclosure, there may be provided an electronic device, wherein a new electronic device performs a login process differently depending on a user authentication type (e.g., an authentication level) performed in the existing terminal, and thus, may maintain a required security level for account information, for example, user information that requires 2FA in order to log in, and may transfer the account information from the existing electronic device to the new electronic device.

According to an embodiment of the disclosure, there may be provided a method of controlling an electronic device, wherein a new electronic device performs a login process differently depending on a user authentication type (e.g., authentication level) performed in the existing terminal, and thus, may maintain a required security level for account information, for example, user information that requires 2FA in order to log in, and may transfer the account information from the existing electronic device to the new electronic device.

An electronic device, according to an embodiment of the disclosure, may include a communication module and at least one processor. The at least one processor may be configured to receive a signal for requesting transmission of user information stored in the electronic device via the communication module from an external electronic device operatively connected to the electronic device, to perform, based on the reception of the signal, a first type authentication or a second type authentication different from the first type authentication, and to transmit, to the external electronic device via the communication module, information associated with whether the first type authentication is performed or the second type authentication is performed, together with the user information so that a login process is performed in the external electronic device that is different depending on the first type authentication or the second type authentication.

An electronic device, according to an embodiment of the disclosure, may include a communication module, a touch screen display, and at least one processor. The at least one processor may be configured to receive, via the touch screen display, a user input for obtaining user information stored in an external electronic device operatively connected to the electronic device from the external electronic device, to transmit, based on the reception of the user input, a signal for requesting transmission of the user information to the external electronic device via the communication module, to receive, based on the transmission of the signal, first information associated with whether a first type authentication is performed or second information associated with whether a second type authentication is performed from the external electronic device together with the user information via the communication module, to identify which type of authentication is performed in the external electronic device based on the first information or the second information, to perform, based on the fact that the first type authentication is performed in the external electronic device, an automatic login process via the electronic device and an account server operatively connected to the electronic device, and to perform, based on the fact that the second type authentication is performed in the external electronic device, a 2FA skip login process via the electronic device and the account server.

A method of controlling an electronic device, according to an embodiment of the disclosure, may include a process of receiving a signal for requesting transmission of user information stored in the electronic device via a communication module of the electronic device from an external electronic device operatively connected to the electronic device, a process of performing, based on the reception of the signal, a first type authentication or a second type authentication different from the first type authentication, and a process of transmitting information associated with whether the first type authentication is performed or information associated with whether the second type authentication is performed, together with the user information, to the external electronic device via the communication module so that a login process is performed in the external electronic device that is different depending to the first type authentication or the second type authentication.

Advantageous Effects

According embodiments of the disclosure, there may be provided electronic devices, where a new or external electronic device performs a login process differently depending on a user authentication type (e.g., an authentication level) performed in an existing terminal or electronic device, and thus, can maintain a required security level for account information, for example, user information that requires 2FA in order to log in, and can transfer the account information from the existing electronic device to the new electronic device.

The effects of various embodiments are not limited to the above-described effects, and it is apparent to those skilled in the art that various effects are immanent in the disclosure.

DESCRIPTION OF THE DRAWINGS

FIGS. 5A and 5B are diagrams illustrating an example of a function or operation of outputting, on a screen, the result of automatic login performed according to an automatic login process, after user information is transmitted to a second electronic device according to an embodiment of the disclosure;

DETAILED DESCRIPTION

Figure 1:
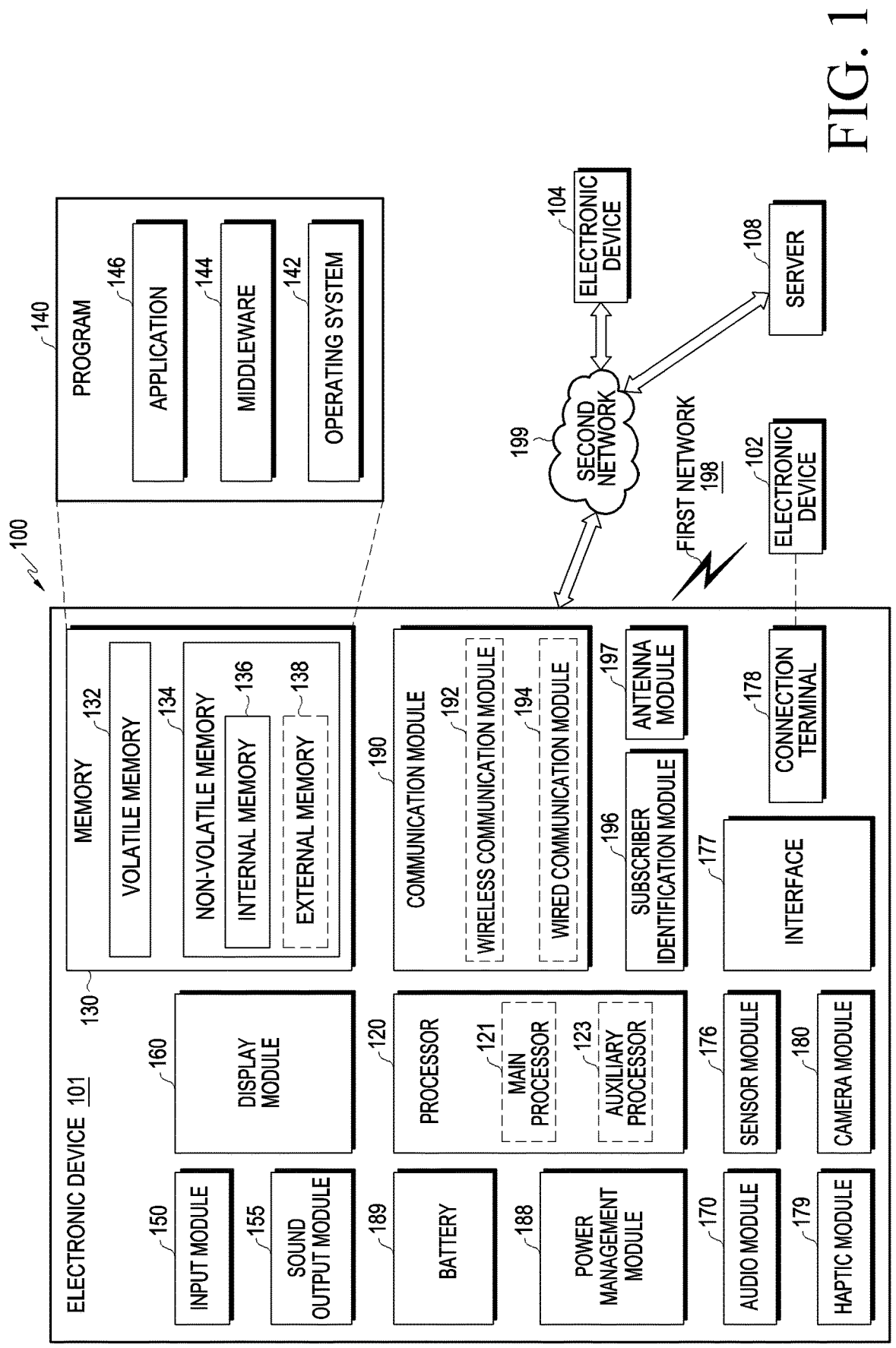
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
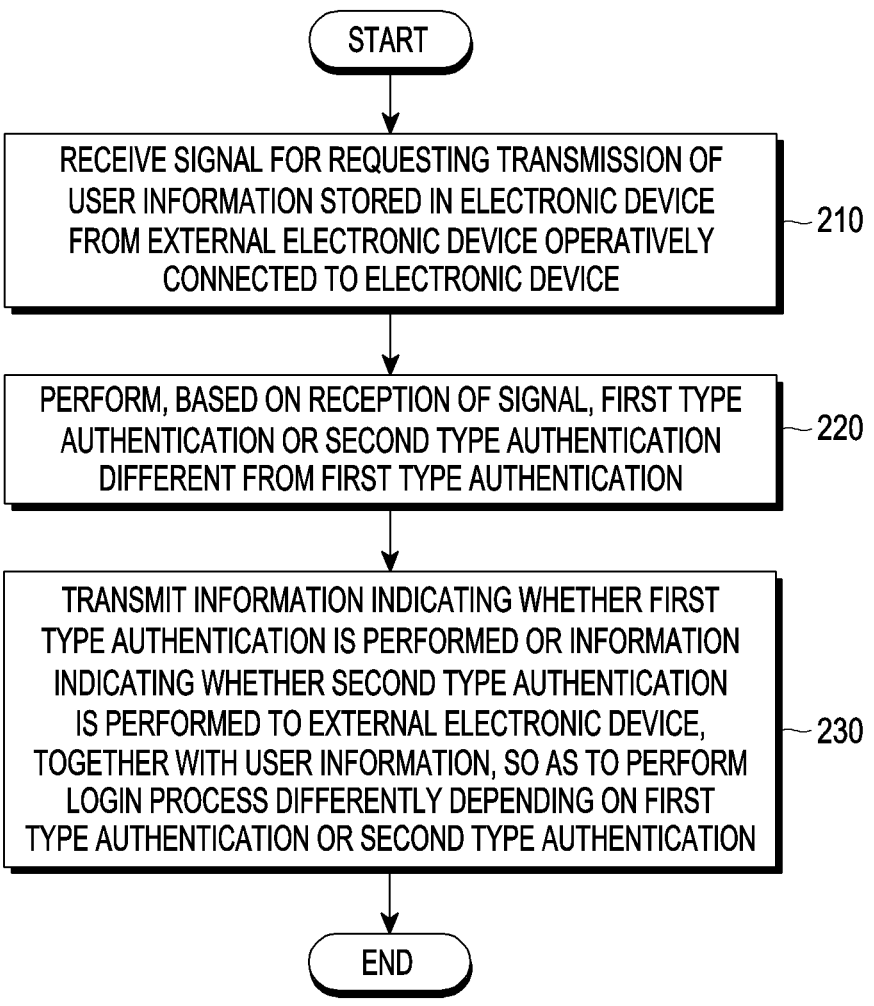
FIG. 2A is a diagram illustrating an example of a function or operation of performing user authentication in a first electronic device (e.g., an existing electronic device), and transmitting the result of user authentication to a second electronic device (e.g., a new electronic device) according to an embodiment of the disclosure.
Figure 2B:
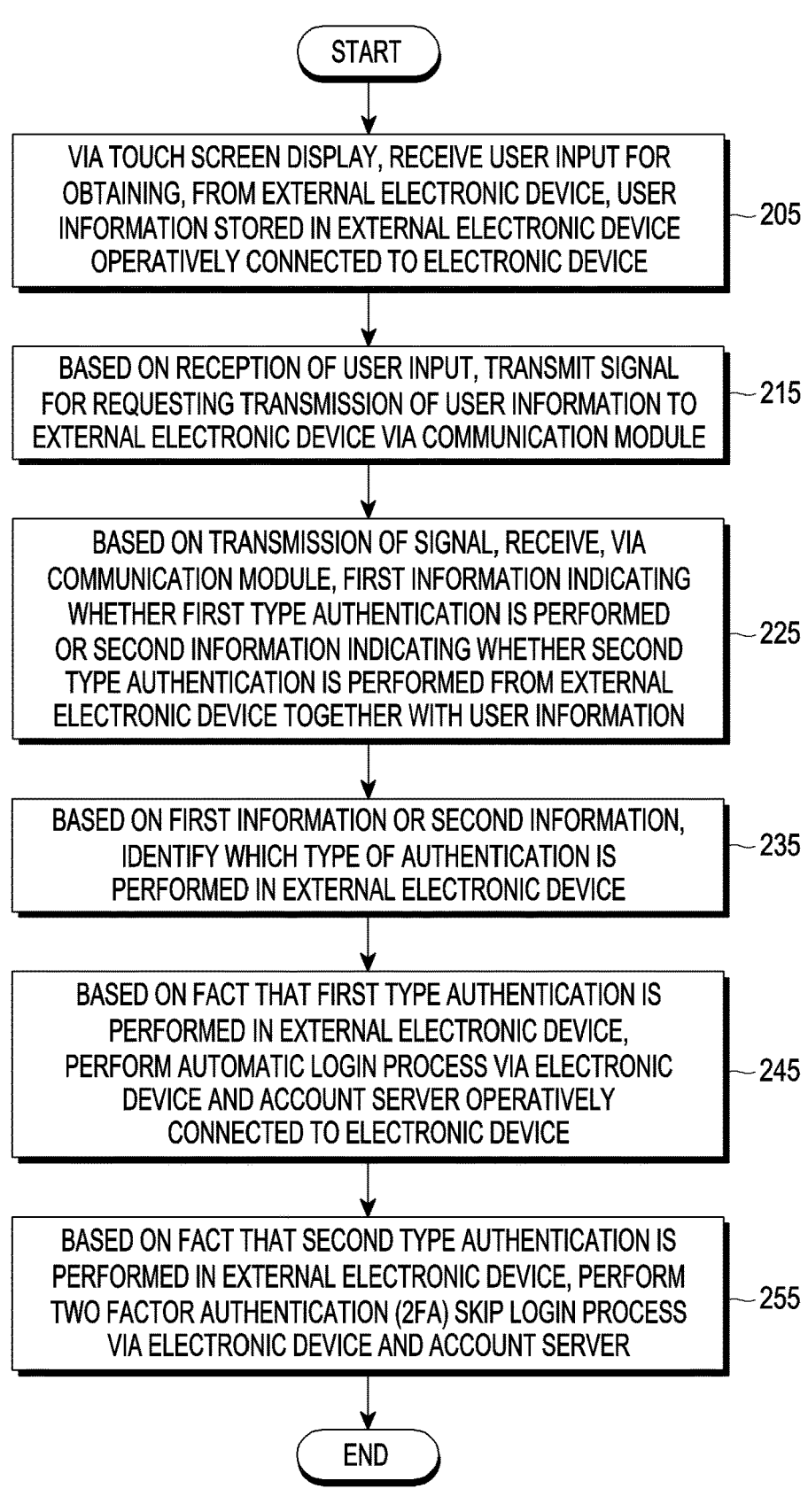
FIG. 2B is a diagram illustrating an example of a function or operation of performing, by a second electronic device, a login process differently depending on a type of user authentication performed in a first electronic device, according to an embodiment of the disclosure.

FIG. 2A is a diagram illustrating an example of a function or operation of performing a user authentication in a first electronic device (e.g., an existing electronic device), and transmitting the result of the user authentication to a second electronic device (e.g., a new electronic device), according to an embodiment of the disclosure. FIG. 2B is a diagram illustrating an example of a function or operation of performing, by the second electronic device, a login process differently depending on the type of user authentication performed in the first electronic device, according to an embodiment of the disclosure.

Referring to FIG. 2A, a first electronic device (e.g., the electronic device 101 of FIG. 1), according to an embodiment of the disclosure, may receive a signal that requests transmission of user information stored in the electronic device 101, from a second or an external electronic device (e.g., the second electronic device, the electronic device 102, or the electronic device 104 of FIG. 1) operatively connected to the electronic device 101 in operation 210. The electronic device 101, according to an embodiment of the disclosure, may be operatively connected to the external electronic device (e.g., the second electronic device, the electronic device 102, or the electronic device 104 of FIG. 1) in a wired communication manner or a wireless communication manner. It will be appreciated that the electronics devices 101, 102, 104 may each be configured similarly as electronic device 101 described above, with the electronics devices having similar or equivalent structures and/or components for performing operations and processes as described herein.

Figure 3A:
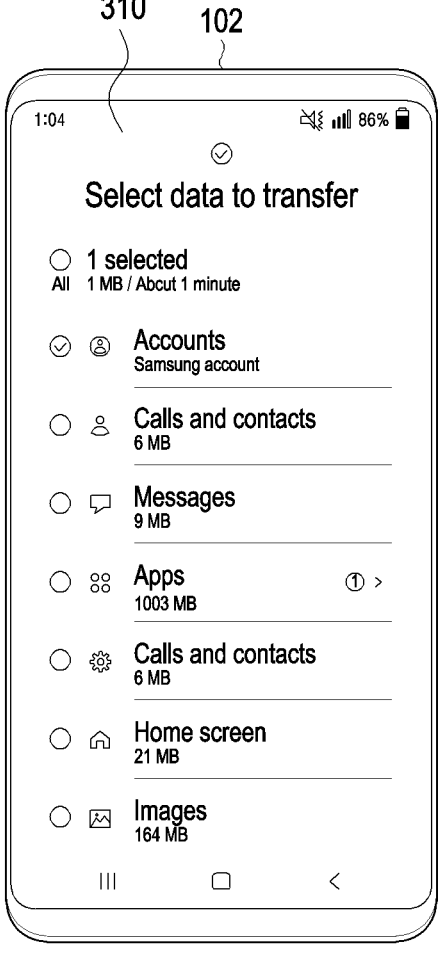
FIGS. 3A and 3B are diagrams illustrating a function or operation of displaying a screen in order to receive, by a second electronic device, a user input for requesting transmission of user information from a first electronic device according to an embodiment of the disclosure.
Figure 3B:

FIGS. 3A and 3B are diagrams illustrating a function or operation of displaying a screen (e.g., a first screen 310 and a second screen 320 in FIGS. 3A-3B) in order to receive, by a second electronic device 102, a user input for requesting transmission of user information from a first electronic device (e.g., electronic device 101), according to an embodiment of the disclosure. An external electronic device (e.g., the second electronic device, the electronic device 102, or the electronic device 104), according to an embodiment of the disclosure, may perform a predetermined application or operation (e.g., Samsung® Smart Switch™) to receive data from the electronic device 101 (e.g., the first electronic device). The external electronic device (e.g., the second electronic device, the electronic device 102, or the electronic device 104), according to an embodiment of the disclosure, may display the execution screen (e.g., the first screen 310) of the predetermined application including a list of data receivable from the electronic device 101 (e.g., the first electronic device). The external electronic device (e.g., the second electronic device, the electronic device 102, or the electronic device 104), according to an embodiment of the disclosure, may receive, from a user, a request for reception of user information from the electronic device (e.g., the first electronic device 101) as illustrated in FIG. 3A.

In FIG. 3A, "Accounts" is ticked so as to indicate the state in which a request for reception of user information from the electronic device (e.g., the first electronic device 101) has been received from a user. In the case in which the external electronic device (e.g., the second electronic device, the electronic device 102, or the electronic device 104), according to an embodiment of the disclosure, receives a confirmation input (e.g., a confirmation icon (not illustrated)), indicating that data to be transferred are all selected by the user, the external electronic device 102 may display a screen (e.g., the second screen 320) as illustrated in FIG. 3B. In the case in which the external electronic device (e.g., the second electronic device, the electronic device 102, or the electronic device 104), according to an embodiment of the disclosure, receives a confirmation input, indicating that data to be transferred are all selected by the user, the external electronic device 102 may transmit a signal for requesting transmission of user information stored in the electronic device 101 (e.g., the first electronic device) to the electronic device 101 (e.g., the first electronic device).

According to an embodiment of the disclosure, FIGS. 3A to 6B are examples of screens for illustrating various embodiments of the disclosure, and various modifications thereof may be implemented. In addition, in the process of performing various embodiments of the disclosure, displaying of at least some of the various screens illustrated in FIGS. 3A to 6B may be omitted or such screens may be displayed differently to include additional or alternative information and/or the arrangement of features, icons, and the like may be different, without departing from the scope of the present disclosure.

Referring again to FIG. 2A, based on the reception of a signal in operation 210, the electronic device 101 (e.g., the first electronic device), according to an embodiment of the disclosure, may perform a first type authentication or a second type authentication different from the first type authentication in operation 220. The first type authentication, according to an embodiment of the disclosure, may include biometric authentication or the like (e.g., iris authentication, fingerprint authentication, face authentication, or the like, and combinations thereof). The second type authentication, according to an embodiment of the disclosure, may include at least one authentication among password authentication, pattern authentication, pin authentication, or the like, and combinations thereof.

The electronic device 101 (e.g., the first electronic device), according to an embodiment of the disclosure, may display a screen for performing user authentication based on an authentication scheme set by a user. For example, in the case in which the user sets fingerprint authentication as a scheme of unlocking the electronic device 101, the electronic device 101 (e.g., the first electronic device), according to an embodiment of the disclosure, may display a screen for performing fingerprint authentication.

Figure 4A:
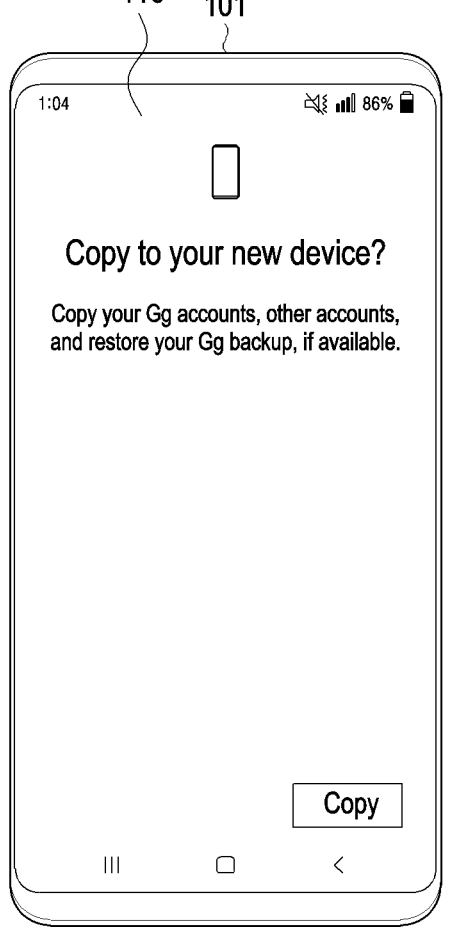
FIGS. 4A to 4C are diagrams illustrating a function or operation of displaying, by a first electronic device, a screen for performing user authentication when a request for transmission of user information is received from a second electronic device according to an embodiment of the disclosure.
Figure 4B:
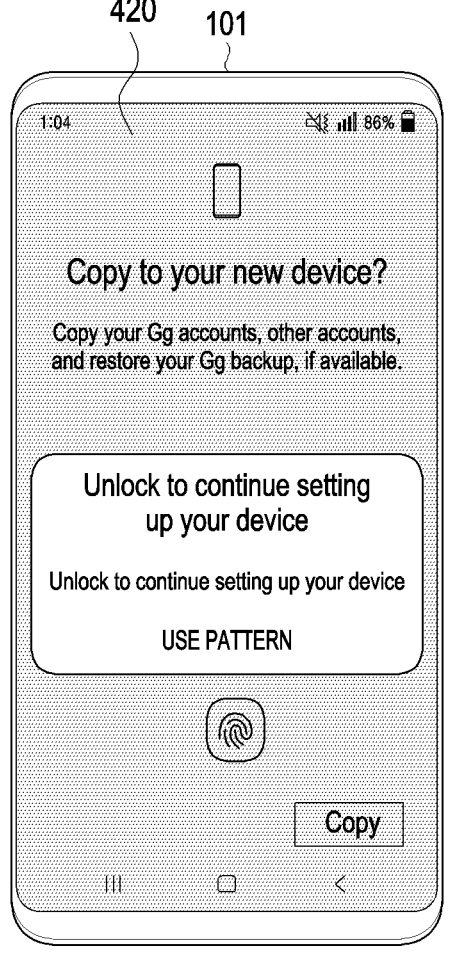
Figure 4C:

FIGS. 4A to 4C are diagrams illustrating a function or operation of displaying, by a first electronic device 101, a screen for performing user authentication when a request for transmission of user information is received from a second electronic device, according to an embodiment of the disclosure. Referring to FIG. 4A, in the case in which electronic device 101 (e.g., the first electronic device), according to an embodiment of the disclosure, receives a signal for requesting transmission of user information stored in the electronic device 101 (e.g., the first electronic device) from an external electronic device (e.g., the second electronic device, the electronic device 102, or the electronic device 104), the electronic device 101 may display a screen (e.g., the third screen 410) as illustrated in FIG. 4A. The electronic device 101 (e.g., the first electronic device), according to an embodiment of the disclosure, may receive a confirmation request from a user, for example, a user input for a "copy" button or icon from the user, the electronic device 101 may display a screen (e.g., a fourth screen 420) for performing an unlock scheme set by a user (e.g., fingerprint authentication). According to an embodiment of the disclosure, in the case in which a plurality of unlock schemes are set by a user, for example, a finger authentication scheme and a pattern authentication scheme, the electronic device 101 (e.g., the first electronic device) may preferentially display a screen for performing a biometric authentication scheme (e.g., the finger authentication scheme preferred over the pattern authentication scheme).

The electronic device 101 (e.g., the first electronic device), according to an embodiment of the disclosure, may transmit information associated with whether the first type authentication is performed or information associated with whether the second type authentication is performed, together with user information, to the external electronic device (e.g., the second electronic device, the electronic device 102, or the electronic device 104) so that a login process is performed in the external electronic device (e.g., the second electronic device, the electronic device 102, or the electronic device 104) that is different depending on the first type authentication or the second type authentication in operation 230. In the case in which user authentication (e.g., fingerprint authentication) is normally performed, the electronic device 101 (e.g., the first electronic device,) according to an embodiment of the disclosure, may display a screen (e.g., the fifth screen 430) as shown in FIG. 4C, for example, a screen indicating that user information is being transmitted to the external electronic device (e.g., the second electronic device, the electronic device 102, or the electronic device 104). In the case in which user authentication (e.g., fingerprint authentication) is normally performed, the electronic device 101 (e.g., the first electronic device), according to an embodiment of the disclosure, may transmit user information stored in the electronic device 101 (e.g., the first electronic device) to the external electronic device (e.g., the second electronic device, the electronic device 102, or the electronic device 104). As described below, information indicating whether the first type authentication is performed and information indicating whether the second type authentication is performed may be transmitted to the external electronic device (e.g., the second electronic device, the electronic device 102, or the electronic device 104), together with an authentication token. According to another embodiment of the disclosure, information associated with whether the first type authentication is performed or information associated with whether the second type authentication is performed may be included in an authentication token by an account server (e.g., included as a string in the payload of an authentication token), and may be transmitted to the external electronic device (e.g., the second electronic device, the electronic device 102, or the electronic device 104).

Referring now to FIG. 2B, in operation 205, the electronic device 102 (e.g., the second electronic device, which may be configured similar to the first electronic device 101), according to an embodiment of the disclosure, may receive a user input for obtaining user information stored in an external electronic device (e.g., the first electronic device, the electronic device 101) operatively connected to the electronic device 102 (e.g., the second electronic device) from the external electronic device 101 via a touch screen display (e.g., a display module 160). Based on the reception of the user input, the electronic device 102 (e.g., the second electronic device), according to an embodiment of the disclosure, may transmit a signal for requesting transmission of user information to the external electronic device (e.g., the first electronic device, the electronic device 101) via a communication module in operation 215. The electronic device 102 (e.g., the second electronic device), according to an embodiment of the disclosure, may receive, from a user, a request for reception of user information from the external electronic device (e.g., the first electronic device, the electronic device 101), as illustrated in FIG. 3A. In FIG. 3A, "Accounts" is ticked in order to indicate the state in which a request for reception of user information from the external electronic device (e.g., the first electronic device, the electronic device 101) has been input by a user. In the case in which the electronic device 102 (e.g., the second electronic device), according to an embodiment of the disclosure, receives a confirmation input (e.g., reception of an input for selecting a confirmation icon (not illustrated)), indicating that data to be transferred are all selected by the user, the electronic device 102 may display a screen (e.g., the second screen 320) as illustrated in FIG. 3B. In the case in which the electronic device 102 (e.g., the second electronic device), according to an embodiment of the disclosure, receives a confirmation input, indicating that data to be transferred are all selected by the user, the electronic device 102 may transmit a signal for requesting transmission of user information stored in the external electronic device (e.g., the first electronic device, the electronic device 101) to the external electronic device (e.g., the first electronic device, the electronic device 101).

Based on the transmission of the signal in operation 215, the electronic device 102 (e.g., the second electronic device), according to an embodiment of the disclosure, may receive first information indicating whether a first type authentication is performed or second information associated with a second type authentication is performed from the external electronic device (e.g., the first electronic device, the electronic device 101) together with the user information via the communication module, in operation 225. In the case in which user authentication (e.g., fingerprint authentication or other biometric authentication) is normally performed, the external electronic device (e.g., the first electronic device, the electronic device 101), according to an embodiment of the disclosure, may transmit the user information stored in the external electronic device (e.g., the first electronic device, the electronic device 101) to the electronic device 102 (e.g., the second electronic device) making the request for data transfer.

As described below, information indicating whether the first type authentication is performed or information indicating whether the second type authentication is performed may be transmitted to the electronic device 102 (e.g., the second electronic device), together with an authentication token. According to another embodiment of the disclosure, information associated with whether the first type authentication is performed or information associated with whether the second type authentication is performed may be included in an authentication token by an account server (e.g., included as a string in the payload of an authentication token), and may be transmitted to the electronic device 102 (e.g., the second electronic device).

In operation 235, the electronic device 102 (e.g., the second electronic device), according to an embodiment of the disclosure, may identify which type of authentication is performed in the external electronic device (e.g., the first electronic device, the electronic device 101), based on the first information or the second information in operation 225. In the case in which a first identifier (e.g., a first flag value) is received as the first information, the electronic device 102 (e.g., the second electronic device), according to an embodiment of the disclosure, may determine that the external electronic device (e.g., the first electronic device, the electronic device 101) has performed biometric authentication in order to transmit user information. In the case in which a second identifier (e.g., a second flag value) is received as the second information, the electronic device 102 (e.g., the second electronic device), according to an embodiment of the disclosure, may determine that the external electronic device (e.g., the first electronic device, the electronic device 101) has performed pattern authentication in order to transmit user information. The electronic device 102 (e.g., the second electronic device), according to another embodiment of the disclosure, may identify which type of authentication is performed in the external electronic device (e.g., the first electronic device, the electronic device 101) using information included in an authentication token. For example, in the case in which an authentication token includes an encoding value of a predetermined character string, a predetermined hash value, or a decoding value for the encoding value of the predetermined character string, the electronic device 102 (e.g., the second electronic device), according to another embodiment of the disclosure, may determine whether such value corresponds to an authentication type, so as to identify which type of authentication is performed in the external electronic device (e.g., the first electronic device, the electronic device 101). To this end, the electronic device 102 (e.g., the second electronic device), according to an embodiment of the disclosure, may store a look-up table that defines the mapping relationship between a predetermined value and an authentication type.

In operation 245, the electronic device 102 (e.g., the second electronic device), according to an embodiment of the disclosure, may perform an automatic login process via the electronic device 102 (e.g., the second electronic device) and the account server, based on the fact that the first type authentication is performed in the external electronic device (e.g., the first electronic device, the electronic device 101). The term "automatic login process," according to an embodiment of the disclosure, may be a login process performed by the electronic device 102 autonomously (e.g., by itself) based on the occurrence of a predetermined event (e.g., reception of user information from the external electronic device) without user information (e.g., a user ID) and/or a password input by a user.

FIGS. 5A and 5B are diagrams illustrating an example of a function or operation of outputting, on a screen, the result of automatic login performed according to an automatic login process, after user information is transmitted to the second electronic device, according to an embodiment of the disclosure. Referring to FIG. 5A, in the case in which the electronic device 102 (e.g., a second electronic device), according to an embodiment of the disclosure, receives at least one user information from an external electronic device (e.g., a first electronic device, the electronic device 101), the electronic device 102 may display a screen (e.g., a sixth screen 510) indicating that the at least one user information has been completely received. In the case in which the electronic device 102 (e.g., the second electronic device,) according to an embodiment of the disclosure, receives a user input (e.g., receives a touch input to "Accounts") in order to identify at least one user information received from the external electronic device (e.g., the first electronic device, the electronic device 101), the electronic device 102 may display a screen (e.g., a seventh screen 520) including at least one received user information as illustrated in FIG. 5B.

FIG. 5B illustrates an example of performing an automatic login to a Samsung® Account™ site using user information of "ccccc@samsung.com". According to an embodiment of the disclosure, biometric authentication has a higher security level than other authentication (e.g., 3P authentication such as password authentication, pattern authentication, pin authentication, etc.) and thus, automatic login may be performed although user information is information configured to require performing of a 2FA process. The requirement of a 2FA process may be based on user information and/or a user account associated with the electronic device. According to an embodiment of the disclosure, in the case in which a plurality of pieces of user information are present for the same site, an automatic login process may be performed using a single piece of user information arbitrarily selected by the external electronic device (e.g., the first electronic device, the electronic device 101). According to another embodiment of the disclosure, in the case in which a plurality of pieces of user information are present for the same site, an automatic login process may be performed using a single piece of user information selected by a user of the external electronic device (e.g., the first electronic device, the electronic device 101). In addition, according to an embodiment of the disclosure, in the case in which a plurality of pieces of user information are present respectively for a plurality of sites, an automatic login process may be performed for each site. The automatic login process, according to an embodiment of the disclosure, may be performed using an authentication token issued by an account server. That will be described in detail with reference to FIGS. 7 and 8A.

In operation 255, the electronic device 102 (e.g., the second electronic device), according to an embodiment of the disclosure, may perform a 2FA skip login process via the electronic device 102 (e.g., the second electronic device) and the account server, based on the fact that the second type authentication is performed in the external electronic device (e.g., the first electronic device, the electronic device 101).

The term "2FA skip login process" mentioned in the disclosure may be a process of performing login by omitting secondary authentication (e.g., inputting verification code) in the case in which the user information is configured to require performing of a 2FA process. In other words, even in the case in which the user information is configured to require performing of a 2FA process, the term "2FA skip login process" mentioned in the disclosure may be a process that enables login only by inputting a user ID and a password.

Figures 6A, 6B:
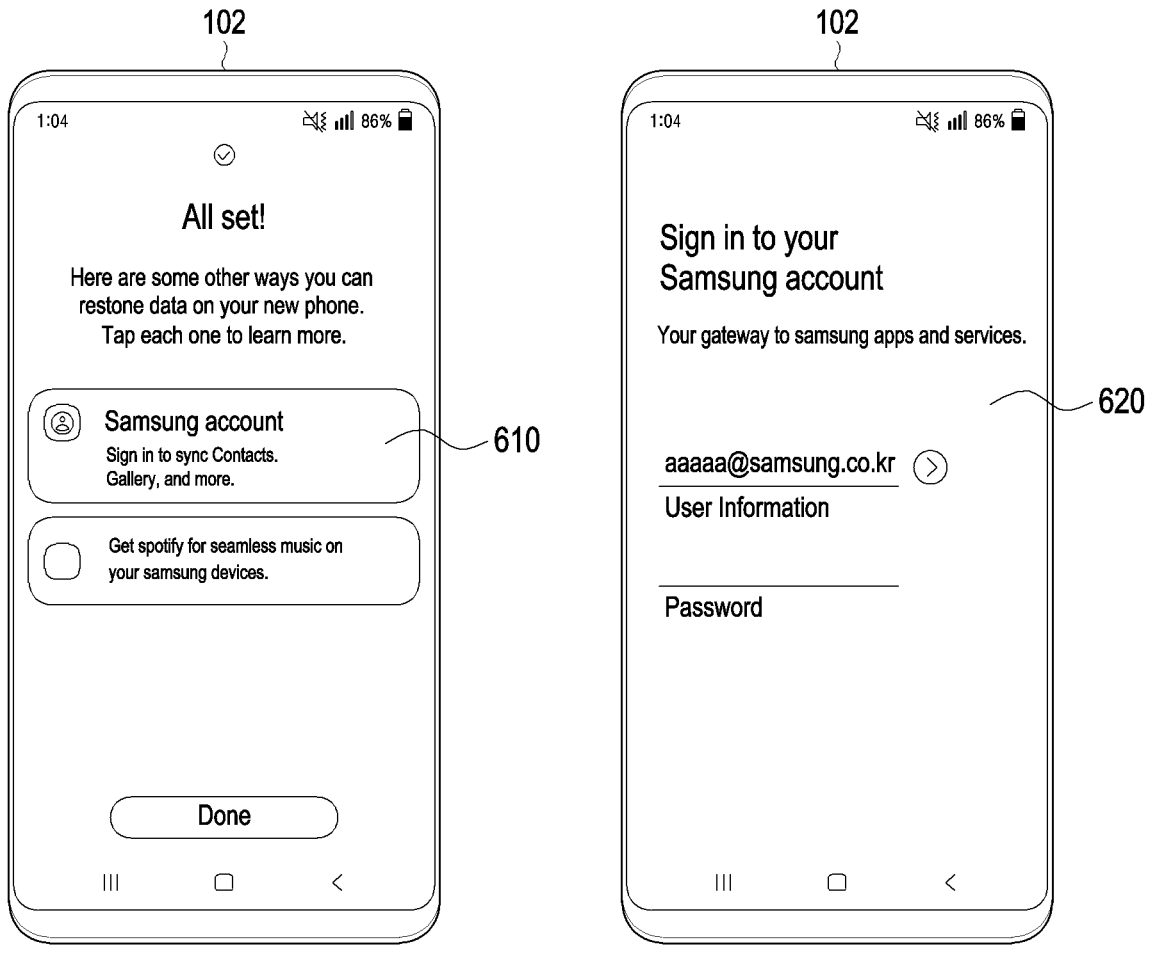
FIGS. 6A and 6B are diagrams illustrating an example of a function or operation of displaying a screen for receiving a password input according to a 2FA skip login process, after user information is transmitted to a second electronic device.

FIGS. 6A and 6B are diagrams illustrating an example of a function or operation of displaying a screen for receiving a password input according to a 2FA skip login process, after user information is transmitted to a second electronic device. Referring to FIG. 6A, in the case in which the electronic device 102 (e.g., a second electronic device), according to an embodiment, receives at least one user information from an external electronic device (e.g., a first electronic device, the electronic device 101), the electronic device 102 may display a screen (e.g., an eighth screen 610) indicating that the at least one user information has been completely received. In the case in which the electronic device 102 (e.g., the second electronic device), according to an embodiment of the disclosure, receives, from a user, a user input (e.g., a touch input to "Samsung account") for performing login, the electronic device 102 (e.g., the second electronic device), according to an embodiment of the disclosure, may display a screen (e.g., a ninth screen 620) for receiving an input password as illustrated in FIG. 6B. According to an embodiment of the disclosure, in FIG. 6B, in the case in which a user input is received for selecting an indicator that is displayed around (e.g., right side) user information (e.g., an email address) and is disposed in the right side, the electronic device 102 (e.g., the second electronic device) may display a field for receiving a password input. The electronic device 102 (e.g., the second electronic device), according to an embodiment of the disclosure, may display, on a ninth screen 620, a field for receiving a password input. According to an embodiment of the disclosure, because 3P authentication has a lower security level than biometric authentication, a new electronic device may require additional user authentication, such as inputting a password in order to perform login. User information (e.g., aaa@samsung.com) may be input to a screen for receiving a password in advance, according to an embodiment of the disclosure. The electronic device 102 (e.g., the second electronic device), according to an embodiment of the disclosure, may perform a login process when a password is input by a user. Such operation will be described in detail with reference to FIGS. 7 and 8A.

Figure 7:
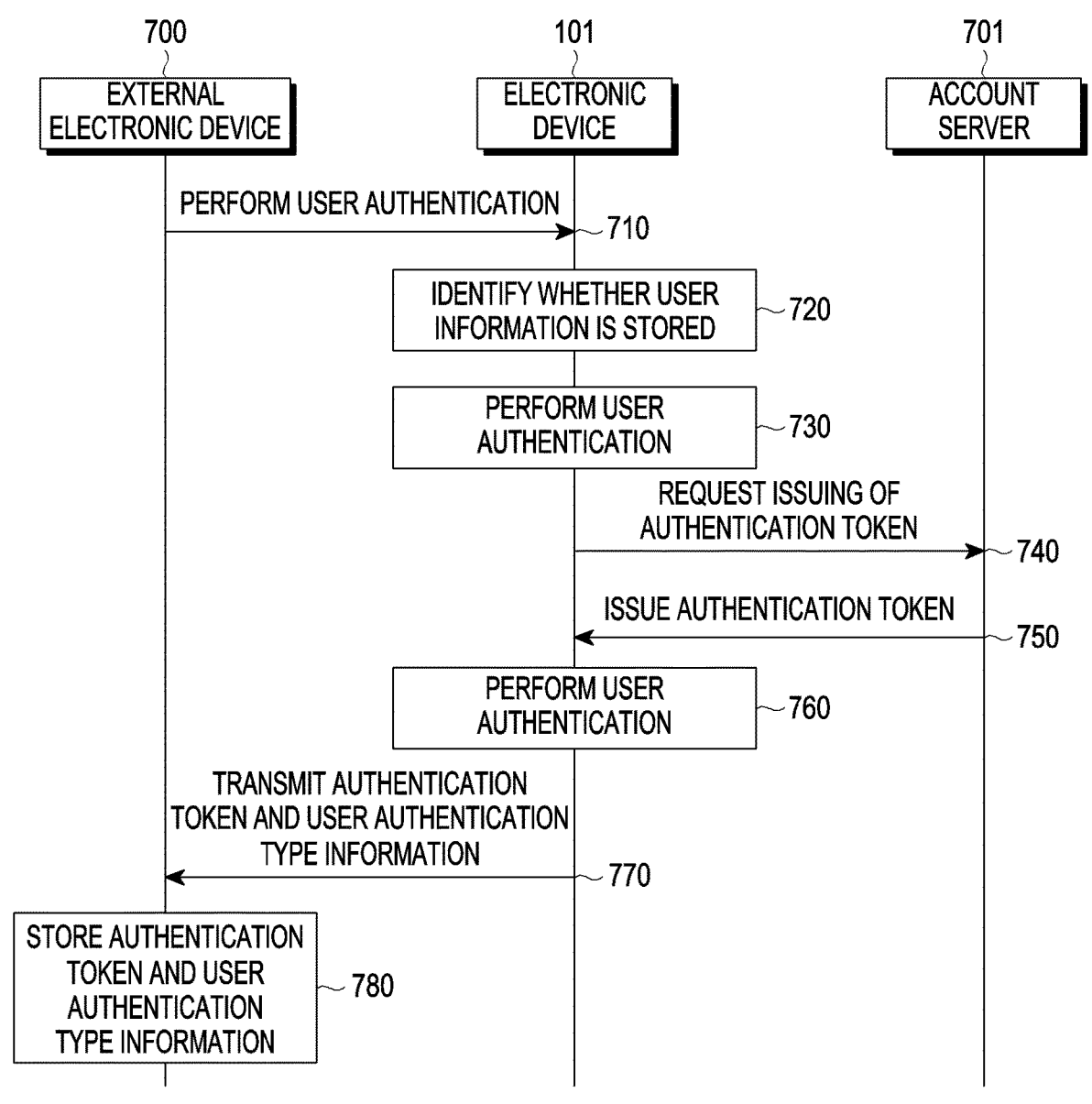
FIG. 7 is a diagram illustrating an example of a function or operation of receiving an authentication token issued from an account server, after a first electronic device performs user authentication according to an embodiment of the disclosure.

FIG. 7 is a schematic process diagram illustrating an example of a function or operation of receiving an authentication token issued from an account server 701 after a first electronic device (the electronic device 101) performs user authentication, according to an embodiment of the disclosure.

Referring to FIG. 7, the electronic device 101 (e.g., the first electronic device), according to an embodiment of the disclosure, may be requested to transmit user information by an external electronic device 700 (e.g., a second electronic device) in operation 710. The external electronic device 700, according to an embodiment of the disclosure, may receive, from a user, a request for reception of user information from the electronic device 101 (e.g., the first electronic device) as illustrated in FIG. 3A. In the case in which the external electronic device 700, according to an embodiment of the disclosure, receives a confirmation input (e.g., reception of an input for selecting a confirmation icon (not illustrated)), indicating that data to be transferred are all selected by a user, the external electronic device 700 may display a screen (e.g., the second screen 320) as illustrated in FIG. 3B. In the case in which the external electronic device 700, according to an embodiment of the disclosure, receives a confirmation input, indicating that data to be transferred are all selected by the user, the external electronic device 700 may transmit a signal for requesting transmission of user information stored in the electronic device 101 (e.g., the first electronic device) to the electronic device 101.

The electronic device 101 (e.g., the first electronic device), according to an embodiment of the disclosure, may identify whether user information is stored in operation 720. In the case in which the user information is stored in the electronic device 101 (e.g., the first electronic device), according to an embodiment of the disclosure, the electronic device 101 may perform user authentication (e.g., biometric authentication or 3P authentication) in operation 730. In the case in which user information is not stored, the electronic device 101, according to an embodiment of the disclosure, may not proceed with user authentication.

In the case in which user authentication is normally performed, the electronic device 101 (e.g., the first electronic device), according to an embodiment of the disclosure, may transmit an authentication token issuing request to the account server 701 in operation 740. The authentication token issuing request, according to an embodiment of the disclosure, may include user information (e.g., a user ID) and a password. The user information (e.g., a user ID) and the password, according to an embodiment of the disclosure, may be encoded and may be transmitted to the account server 701. According to another embodiment of the disclosure, the authentication token issuing request may include information associated with the type of user authentication performed (e.g., biometric authentication, 3P authentication, etc.). In the case in which the electronic device 101 (e.g., the first electronic device) transmits login information (e.g., user information and/or password) to the account server 701, an authentication token, according to an embodiment of the disclosure, may be information (e.g., an identifier or a character string) that verifies that the login information transmitted to the account server 701 is valid.

The authentication token, according to an embodiment of the disclosure, may be produced by the account server 701. The account server 701, according to an embodiment of the disclosure, may issue (e.g., produce) an authentication token when the login information is valid, and may transmit the same to the electronic device 101 (e.g., the first electronic device) in operation 750. The authentication token, according to an embodiment of the disclosure, may include, for example, a header, a payload, and a signature. According to an embodiment of the disclosure, the payload of the authentication token may include information associated with the type of user authentication performed (e.g., biometric authentication, 3P authentication, etc.). The electronic device 101 (e.g., the first electronic device), according to an embodiment of the disclosure, may store the authentication token received from the account server 701 in operation 760. The electronic device 101 (e.g., the first electronic device), according to an embodiment of the disclosure, may transmit the authentication token and the user authentication type information to the external electronic device 700 (e.g., the second electronic device) in operation 770. According to another embodiment of the disclosure, in the case in which the user authentication type information is included in the authentication token, only the authentication token may be transmitted to the external electronic device 700 (e.g., the second electronic device). The external electronic device 700 (e.g., the second electronic device) according to an embodiment of the disclosure may store the authentication token and the user authentication type information in operation 780.

Figure 8A:
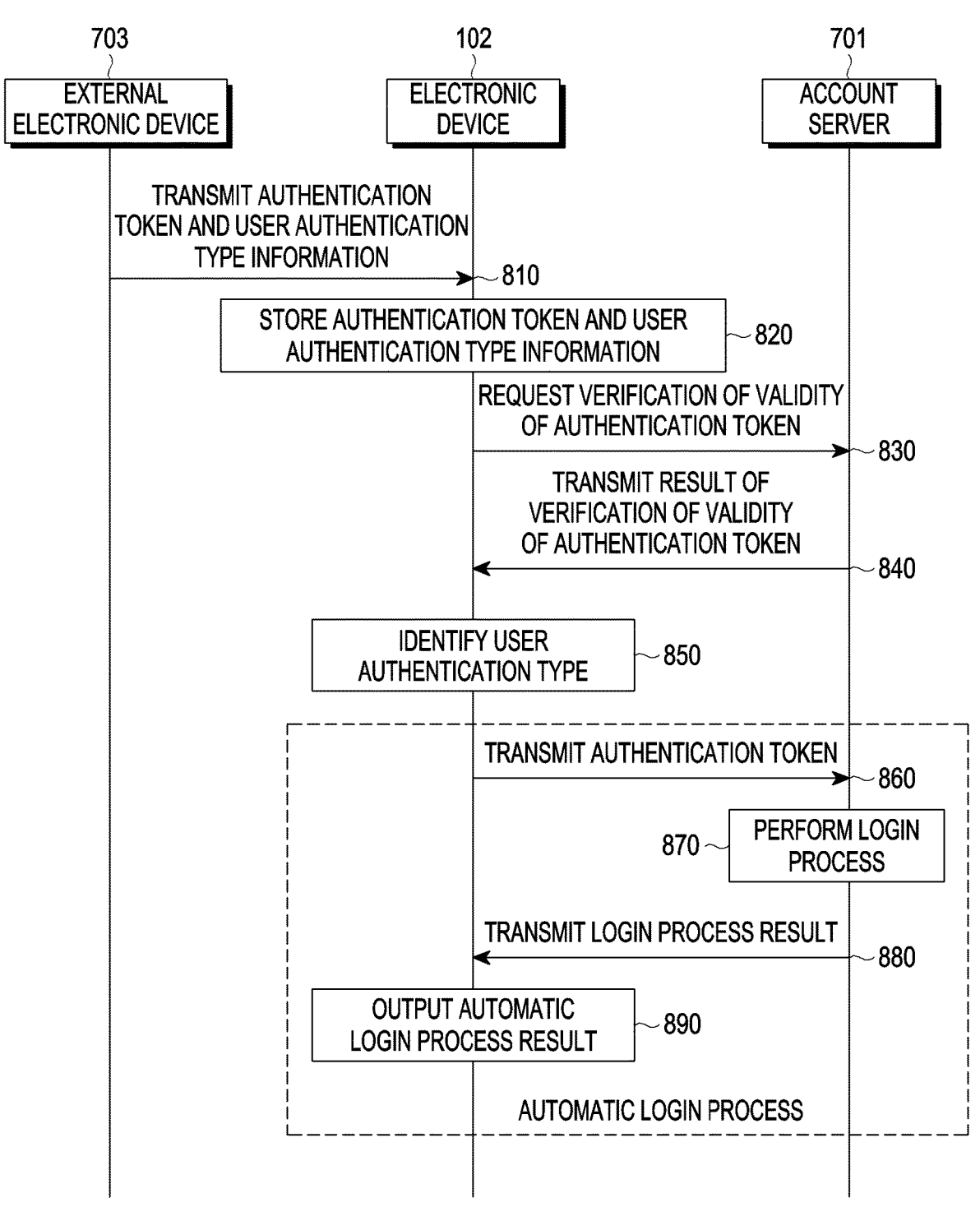
FIG. 8A is a diagram illustrating an example of a function or operation of performing an automatic login process by a second electronic device according to an embodiment of the disclosure.

FIG. 8A is a diagram illustrating an example of a function or operation of performing an automatic login process by a second electronic device, according to an embodiment of the disclosure.

Referring to FIG. 8A, the external electronic device 703 (e.g., a first electronic device), according to an embodiment of the disclosure, may transmit an authentication token and user authentication type information to the electronic device 102 (e.g., a second electronic device) in operation 810. The electronic device 102 (e.g., the second electronic device), according to an embodiment of the disclosure, may store the received authentication token and user authentication type information in operation 820.

The electronic device 102 (e.g., the second electronic device), according to an embodiment of the disclosure, may request the account server 701 to verify the validation of the authentication token in operation 830. The verification of validation of the authentication token, according to an embodiment of the disclosure, may be performed, for example, by determining, by the account server 701, whether the issuer of the authentication token is identical to the account server 701, whether an expiration time of the authentication token elapses, and/or whether a signature value stored in the account server 701 and the signature value of the authentication token are identical. In addition, various verification schemes may be applicable, as will be appreciated by those of skill in the art. The account server 701, according to an embodiment of the disclosure, may transmit the result of verification of validation of the authentication token to the electronic device 102 (e.g., the second electronic device) in operation 840. According to another embodiment of the disclosure, the operation 830 and the operation 840 may be optionally omitted.

If the account server 701 determines that the authentication token is valid, the electronic device 102 (e.g., the second electronic device), according to an embodiment of the disclosure, may identify the type of user authentication in operation 850. For example, the electronic device 102 (e.g., the second electronic device), according to an embodiment of the disclosure, may identify which type of authentication is performed in the external electronic device 703 based on first information or second information (e.g., operation 225 of FIG. 2B). In the case in which a first identifier (e.g., a first flag value) is received as the first information, the electronic device 102 (e.g., the second electronic device), according to an embodiment of the disclosure, may determine that the external electronic device 703 has performed biometric authentication in order to transmit user information. In the case in which a second identifier (e.g., a second flag value) is received as the second information, the electronic device 102 (e.g., the second electronic device), according to an embodiment of the disclosure, may determine that the external electronic device 703 has performed pattern authentication in order to transmit user information. The electronic device 102 (e.g., the second electronic device), according to another embodiment of the disclosure, may identify which type of authentication is performed in the external electronic device 703 (e.g., the first electronic device, the electronic device 101) using information included in the authentication token. For example, in the case in which the authentication token includes an encoding value of a predetermined character string, a predetermined hash value, or a decoding value for the encoding value of the predetermined character string, the electronic device 102 (e.g., the second electronic device), according to another embodiment of the disclosure, may determine whether such value corresponds to an authentication type, so as to identify which type of authentication is performed in the external electronic device 703. In FIG. 8A, for ease of description, description will be provided on the assumption that it is determined that the external electronic device 703 performs biometric authentication.

The electronic device 102 (e.g., the second electronic device), according to an embodiment of the disclosure, may determine that the external electronic device 703 (e.g., the first electronic device) performs biometric authentication, and may transmit, to the account server 701, the authentication token for performing an automatic login process. The electronic device 102 (e.g., the second electronic device), according to an embodiment of the disclosure, may proceed with operation 860 without a special input by a user. The account server 701, according to an embodiment of the disclosure, may perform a login process in operation 870 when the authentication token is transmitted from the electronic device 102 (e.g., the second electronic device). The login process, according to an embodiment of the disclosure, may include a process of verifying the authentication token. The verification of the authentication token, according to an embodiment of the disclosure, may include, for example, a process of determining whether the issuer of the authentication token is identical to the account server 701, whether an expiration time of the authentication token elapses, and/or whether a signature value stored in the account server 701 and the signature value of the authentication token are identical. In the case in which it is verified that the authentication token is valid, the account server 701, according to an embodiment of the disclosure, may determine that the user of the electronic device 102 is determined as a proper user. According to another embodiment of the disclosure, the authentication token may include encoded user information and password. The account server 701, according to an embodiment of the disclosure, may perform a login process by decoding the encoded user information and password, and comparing the same with user information stored in the account server 701. The account server 701, according to an embodiment of the disclosure, may transmit the result of the login process in operation 880. The electronic device 102 (e.g., the second electronic device), according to an embodiment of the disclosure, may output the result of the automatic login process in operation 890. For example, the electronic device 102 (e.g., the second electronic device), according to an embodiment of the disclosure, may display a screen, such as illustrated in FIG. 5A, after the user information is received from the external electronic device 703 and the automatic login process is completed (e.g., after receiving the login process result from the account server 701).

Figure 8B:
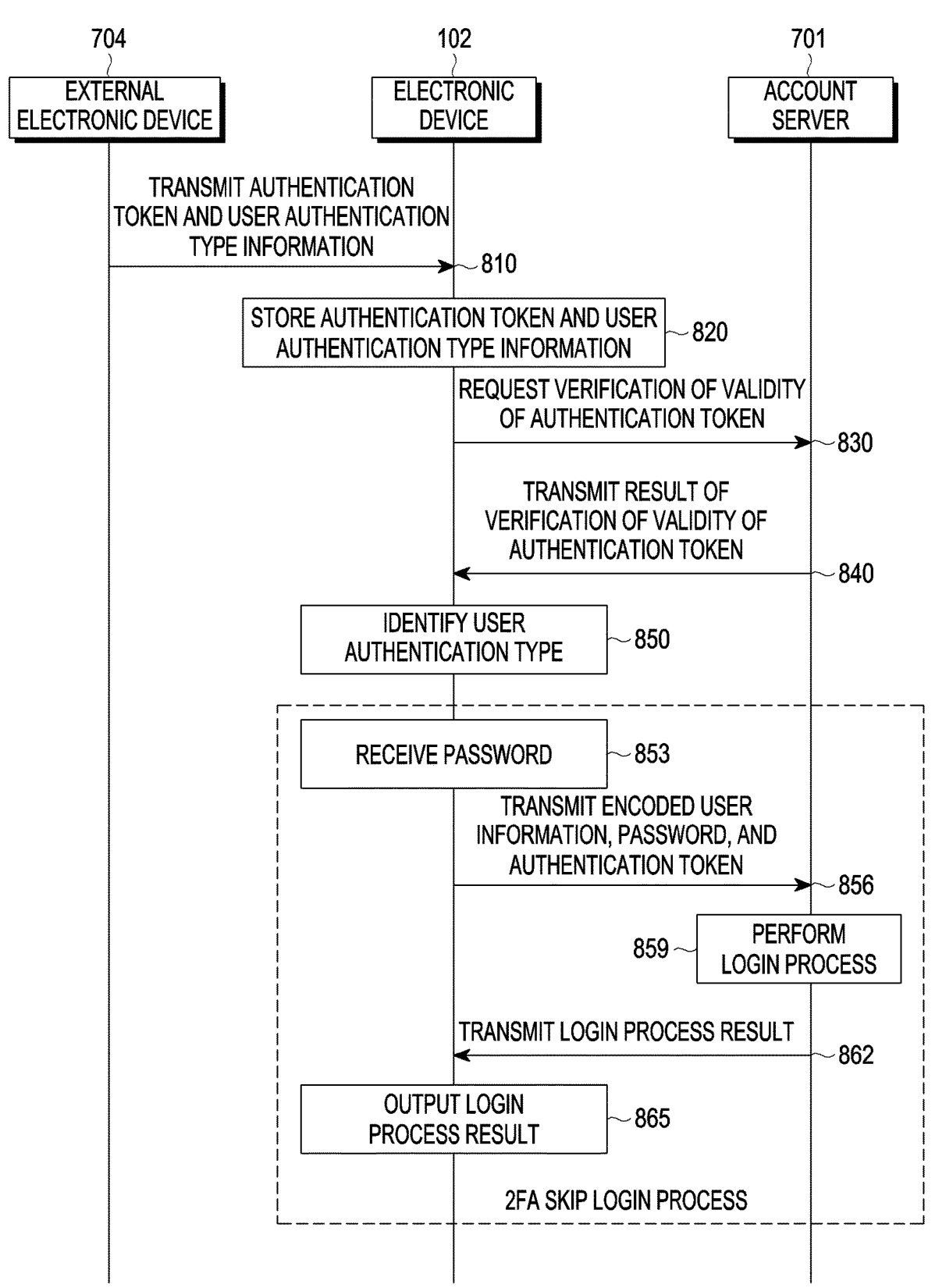
FIG. 8B is a diagram illustrating an example of a function or operation of performing a 2FA skip login process by a second electronic device according to an embodiment of the disclosure.

FIG. 8B is a diagram illustrating an example of a function or operation of performing a 2FA skip login process by a second electronic device 102 according to an embodiment of the disclosure.

Referring to FIG. 8B, the external electronic device 704 (e.g., a first electronic device), according to an embodiment of the disclosure, may transmit an authentication token and user authentication type information to the electronic device 102 (e.g., a second electronic device) in operation 810. The electronic device 102 (e.g., the second electronic device), according to an embodiment of the disclosure, may store the received authentication token and user authentication type information in operation 820.

The electronic device 102 (e.g., the second electronic device), according to an embodiment of the disclosure, may request the account server 701 to verify the validation of the authentication token in operation 830. The verification of validation of the authentication token, according to an embodiment of the disclosure, may be performed, for example, by determining, by the account server 701, whether the issuer of the authentication token is identical to the account server 701, whether the expiration time of the authentication token elapses, and/or whether a signature value stored in the account server 701 and the signature value of the authentication token are identical. In addition, various verification schemes may be applicable, as will be appreciated by those of skill in the art. The account server 701, according to an embodiment of the disclosure, may transmit the result of verification of validation of the authentication token to the electronic device 102 (e.g., the second electronic device) in operation 840. According to another embodiment of the disclosure, the operation 830 and the operation 840 may be omitted.

In the case in which the account server 701 determines that the authentication token is valid, the electronic device 102 (e.g., the second electronic device), according to an embodiment of the disclosure, may identify the type of user authentication in operation 850. For example, the electronic device 102 (e.g., the second electronic device), according to an embodiment of the disclosure, may identify which type of authentication is performed in the external electronic device 704 based on first information or second information (e.g., operation 225 of FIG. 2B). In the case in which a first identifier (e.g., a first flag value) is received as the first information, the electronic device 102 (e.g., the second electronic device), according to an embodiment of the disclosure, may determine that the external electronic device 704 has performed biometric authentication in order to transmit user information. In the case in which a second identifier (e.g., a second flag value) is received as the second information, the electronic device 102 (e.g., the second electronic device), according to an embodiment of the disclosure, may determine that the external electronic device 704 has performed pattern authentication in order to transmit user information. The electronic device 102 (e.g., the second electronic device), according to another embodiment of the disclosure, may identify which type of authentication is performed in the external electronic device 704 (e.g., the first electronic device, the electronic device 101) using information included in the authentication token. For example, in the case in which the authentication token includes an encoding value of a predetermined character string, a predetermined hash value, or a decoding value for the encoding value of the predetermined character string, the electronic device 102 (e.g., the second electronic device), according to another embodiment of the disclosure, may determine whether such value corresponds to an authentication type, so as to identify which type of authentication is performed in the external electronic device 704. In FIG. 8B, for ease of description, description will be provided on the assumption that it is determined that the external electronic device 704 performs pattern authentication.

In operation 853, the electronic device 102 (e.g., the second electronic device), according to an embodiment of the disclosure, may display a screen (e.g., the ninth screen 620) in order to receive a password input by a user, and may receive a password input by the user. The electronic device 102 (e.g., the second electronic device), according to an embodiment of the disclosure, may transmit encoded user information, an encoded password, and an encoded token to the account server 701 in operation 856. According to another embodiment of the disclosure, the electronic device 102 (e.g., the second electronic device) may transmit only the encoded user information and encoded password to the account server 701. The account server 701, according to an embodiment of the disclosure, may perform a login process in operation 859. The account server 701, according to an embodiment of the disclosure, may perform the login process via at least one scheme among a scheme of verifying the validation of the authentication token or a scheme of decoding the encoded user information and encoded password and comparing the same with user information and password stored in the account server 701. As described above in association with operation 740, the authentication token, according to an embodiment of the disclosure, may include information associated with the type of authentication performed (e.g., pattern authentication). The account server 701, according to an embodiment of the disclosure, may be aware of the type of authentication performed in the external electronic device 704 based on the information associated with the authentication type included in the authentication token.

FIG. 8B illustrates the case in which pattern authentication is performed and thus, the account server 701, according to an embodiment of the disclosure, may transmit, to the electronic device 102 (e.g., the second electronic device), a login process result and a command that directs the electronic device 102 to omit secondary authentication in 2FA in operation 862. The electronic device 102, according to an embodiment of the disclosure, may omit the secondary authentication based on the command received from the account server 701, and may proceed with operation 865. The electronic device 102 (e.g., the second electronic device), according to an embodiment of the disclosure, may display a notification message such as a popup message, as a login process result indicating that login is successfully performed.

According to another embodiment of the disclosure, the case in which user information is configured not to require performing of a 2FA process may be considered. According to an embodiment of the disclosure, in the case in which the user information is configured not to require performing of a 2FA process, and second type authentication (e.g., pattern authentication) is performed in the first electronic device, an automatic login process may be performed in the second electronic device. According to an embodiment of the disclosure, in the case in which the user information is configured not to require performing of a 2FA process, and first type authentication (e.g., fingerprint authentication) is performed in the first electronic device, an automatic login process may be performed in the second electronic device.

An electronic device (e.g., the electronic device 101 of FIG. 1), according to an embodiment of the disclosure, may include a communication module (e.g., the communication module 190 of FIG. 1), and at least one processor (e.g., the processor 120 of FIG. 1), wherein the at least one processor is configured to receive a signal for requesting transmission of user information stored in the electronic device via the communication module from an external electronic device operatively connected to the electronic device, to perform, based on the reception of the signal, first type authentication or second type authentication different from the first type authentication, and to transmit, to the external electronic device via the communication module, information associated with whether the first type authentication is performed or the second type authentication is performed, together with the user information so that a login process depending on the first type authentication or the second type authentication is performed in the external electronic device.

An electronic device (e.g., the electronic device 101 of FIG. 1), according to an embodiment, may include a communication module (e.g., the communication module 190 of FIG. 1), a touch screen display (e.g., the display module 160 of FIG. 1), and at least one processor (e.g., the processor 120 of FIG. 1), wherein the at least one processor is configured to receive, via the touch screen display, a user input for obtaining user information stored in an external electronic device operatively connected to the electronic device from the external electronic device, to transmit, based on the reception of the user input, a signal for requesting transmission of the user information to the external electronic device via the communication module, to receive, based on the transmission of the signal, first information associated with whether first type authentication is performed or second information associated with whether second type authentication is performed from the external electronic device together with the user information via the communication module, to identify which type of authentication is performed in the external electronic device based on the first information or the second information, based on the fact that the first type authentication is performed in the external electronic device, to perform an automatic login process via the electronic device and an account server operatively connected to the electronic device, and based on the fact that the second type authentication is performed in the external electronic device, to perform a two factor authentication (2FA) skip login process via the electronic device and the account server.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities, and some of the multiple entities may be separately disposed in different components. According to an embodiment of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication module; and
at least one processor,
a touch screen display, and
memory storing instructions,
wherein the instructions, when executed by the at least one processor, cause the electronic device to:
display, via the touch screen display, an execution screen of a first application configured to transmit data stored in the electronic device to an external electronic device operatively connected to the electronic device,
while the execution screen of the first application is displayed on the display, receive a signal for requesting transmission of user information stored in the electronic device via the communication module from the external electronic device,
based on reception of the signal, perform a first type authentication or a second type authentication different from the first type authentication, wherein the first type authentication includes biometric authentication, and the second type authentication includes at least one of pattern authentication, pin authentication, or password authentication, and
transmit, to the external electronic device via the communication module, a token together with the user information, so that a login process is performed in the external electronic device receiving the data from the electronic device based on the first type authentication or the second type authentication, wherein the login process includes an automatic login process or a two factor authentication (2FA) skip login process, the token comprising a value that indicates whether the whether the first type authentication is performed or the second type authentication is performed, the value being one of a predetermined character string, a predetermined hash value, or a decoding value for the encoding value of the predetermined character string.

2. The electronic device of claim 1, wherein the instructions cause the electronic device to receive the token corresponding to the user information via the communication module from an account server that is operatively connected to the electronic device.

3. The electronic device of claim 2, wherein the instructions cause the electronic device to transmit the token together with the user information to the external electronic device via the communication module.

4. The electronic device of claim 1, wherein the user information includes a user account configured to require performing of the 2FA login process.

5. The electronic device of claim 1, wherein the instructions cause the electronic device to determine, based on the reception of the signal, whether the user information is stored in the electronic device.

6. An electronic device comprising:
a communication module;
a touch screen display;
at least one processor, and
memory storing instructions, wherein the instructions, when executed by the at least one processor, cause the electronic device to:

receive, via the touch screen display, a user input for obtaining user information stored in an external electronic device operatively connected to the electronic device from the external electronic device, transmit to the external electronic device, based on reception of the user input, a signal for requesting transmission of the user information via the communication module, receive, based on the transmission of the signal, from the external electronic device, a token together with the user information via the communication module, wherein the first type authentication includes biometric authentication, and the second type authentication includes at least one of pattern authentication, pin authentication, or password authentication, the token comprising a value that indicates whether the whether a first type authentication is performed or a second type authentication is performed, the value being one of a predetermined character string, a predetermined hash value, or a decoding value for the encoding value of the predetermined character string, display, via the touch screen display, an execution screen of a first application configured to receive the user information from the external electronic device, wherein the execution screen of the first application includes information that a reception of the user information from the external electronic device is completed, while the execution screen of the first application is displayed on the touch screen display, identify which type of authentication is performed in the external electronic device based on the token, based on the first type authentication being performed in the external electronic device, perform an automatic login process, and based on the second type authentication being performed in the external electronic device, perform a two factor authentication (2FA) skip login process.

7. The electronic device of claim 6, wherein the instructions cause the electronic device to receive the token corresponding to the user information from the external electronic device via the communication module.

8. The electronic device of claim 7, wherein the instructions cause the electronic device to perform the automatic login process by transmitting the token to the account server operatively connected to the electronic device.

9. The electronic device of claim 7, wherein the instructions cause the electronic device to receive a password input by a user, and to transmit the token, the user information, and the password to the account server, so as to perform the 2FA skip login process.

10. A non-transitory storage medium storing one or more program, the one or more program comprising executable instructions, when executed by at least one processor of an electronic device, cause the electronic device to:

receive, via a touch screen display of the electronic device, a user input for obtaining user information stored in an external electronic device operatively connected to the electronic device from the external electronic device, transmit to the external electronic device, based on reception of the user input, a signal for requesting transmission of the user information via a communication module of the electronic device, receive, based on the transmission of the signal, from the external electronic device, a token together with the user information via the communication module, wherein the first type authentication includes biometric authentication, and the second type authentication includes at least one of pattern authentication, pin authentication, or password authentication, the token comprising a value that indicates whether the whether a first type authentication is performed or a second type authentication is performed, the value being one of a predetermined character string, a predetermined hash value, or a decoding value for the encoding value of the predetermined character string, display, via the touch screen display, an execution screen of a first application configured to receive the user information from the external electronic device, wherein the execution screen of the first application includes information that a reception of the user information from the external electronic device is completed, while the execution screen of the first application is displayed on the touch screen display, identify which type of authentication is performed in the external electronic device based on the token, based on the first type authentication being performed in the external electronic device, perform an automatic login process, and based on the second type authentication being performed in the external electronic device, perform a two factor authentication (2FA) skip login process.

11. The non-transitory storage medium of claim 10, wherein the instructions cause the electronic device to receive the token corresponding to the user information via the communication module from an account server operatively connected to the electronic device.

12. The non-transitory storage medium of claim 11, wherein the instructions cause the electronic device to transmit the token together with the user information to the external electronic device via the communication module.

13. The non-transitory storage medium of claim 10, wherein the user information includes a user account configured to require performing of the 2FA login process.

14. The non-transitory storage medium of claim 10, wherein the instructions cause the electronic device to, based on the reception of the signal, determine whether the user information is stored in the electronic device.

* * * * *